United States Patent [19]

Schweitzer, III et al.

[11] Patent Number: 5,041,737
[45] Date of Patent: Aug. 20, 1991

[54] PROGRAMMABLE BUS-TIE RELAY HAVING A PLURALITY OF SELECTABLE SETTING GROUPS

[75] Inventors: Edmund O. Schweitzer, III, Pullman; Jeffrey B. Roberts, Albion, both of Wash.

[73] Assignee: Schweitzer Engineering Laboratories, Inc., Pullman, Wash.

[21] Appl. No.: 470,061

[22] Filed: Jan. 25, 1990

[51] Int. Cl.$^5$ ............................................. H01H 35/00
[52] U.S. Cl. .................................... 307/125; 307/112; 364/492
[58] Field of Search ............... 307/112, 125, 126, 127, 307/130, 131, 12, 31, 64; 361/62, 115, 114; 364/480, 492; 340/825.06, 825.16

[56] References Cited

U.S. PATENT DOCUMENTS 4,710,845 12/1987 Demeyer ............................ 361/96
4,724,502 2/1988 Kawahira et al. .................... 361/62
4,774,621 9/1988 Andow ............................... 364/492
4,788,647 11/1988 McManus et al. .................... 364/492

Primary Examiner—Todd E. Deboer
Assistant Examiner—Jeffrey A. Gaffin
Attorney, Agent, or Firm—Jensen & Puntigam

[57] ABSTRACT

A bus-tie relay apparatus which includes a multi-position mechanical switch (54) and a logic circuit (56) responsive to the position of the mechanical switch (54) for producing digital signals on five digital lines (58), wherein a valid digital signal comprises the presence of high conditions on two, and two only, of said digital lines (58). A sensor (80) senses the condition of the digital lines (58) and retrieves the values of a relay element setting group from memory associated with that digital signal. A plurality of such relay element setting groups are stored in the apparatus, each one of which comprises values corresponding to the characteristics of an inplace relay associated with a particular one transmission line in a group thereof.

14 Claims, 4 Drawing Sheets

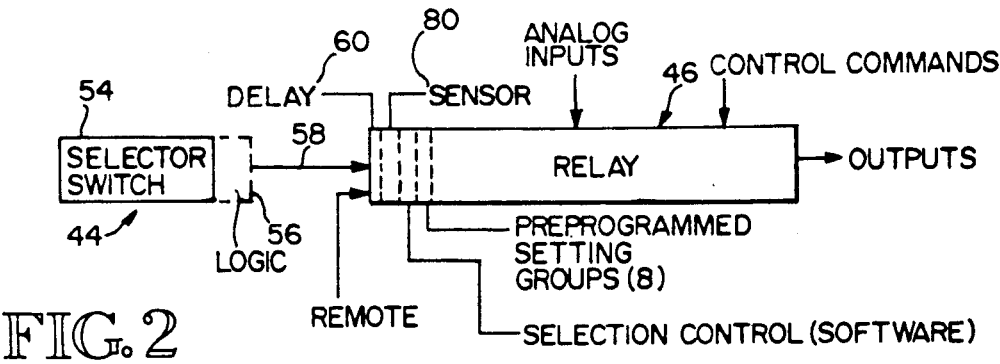
FIG. 2
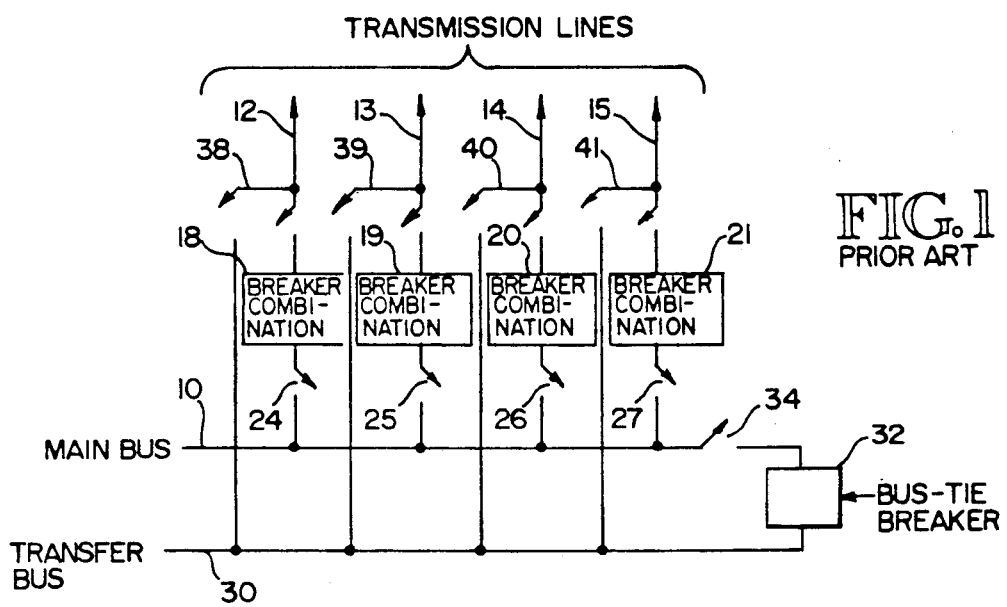
FIG. 1 PRIOR ART
| SETTING GROUPS | CONTACT INPUTS | | | | |
|---|---|---|---|---|---|
| | S1 | S2 | S3 | S4 | S5 |
| SETTING #1 | 1 | 2 | 0 | 0 | 0 |
| SETTING #2 | 0 | 1 | 1 | 0 | 0 |
| SETTING #3 | 0 | 0 | 1 | 1 | 0 |
| SETTING #4 | 0 | 0 | 0 | 1 | 1 |
| SETTING #5 | 1 | 0 | 1 | 0 | 0 |
| SETTING #6 | 0 | 1 | 0 | 1 | 0 |
| SETTING #7 | 0 | 0 | 1 | 0 | 1 |
| SETTING #8 | 1 | 0 | 0 | 1 | 0 |
| REMOTE | 0 | 1 | 0 | 0 | 1 |
SWITCH SETTING
FIG. 3

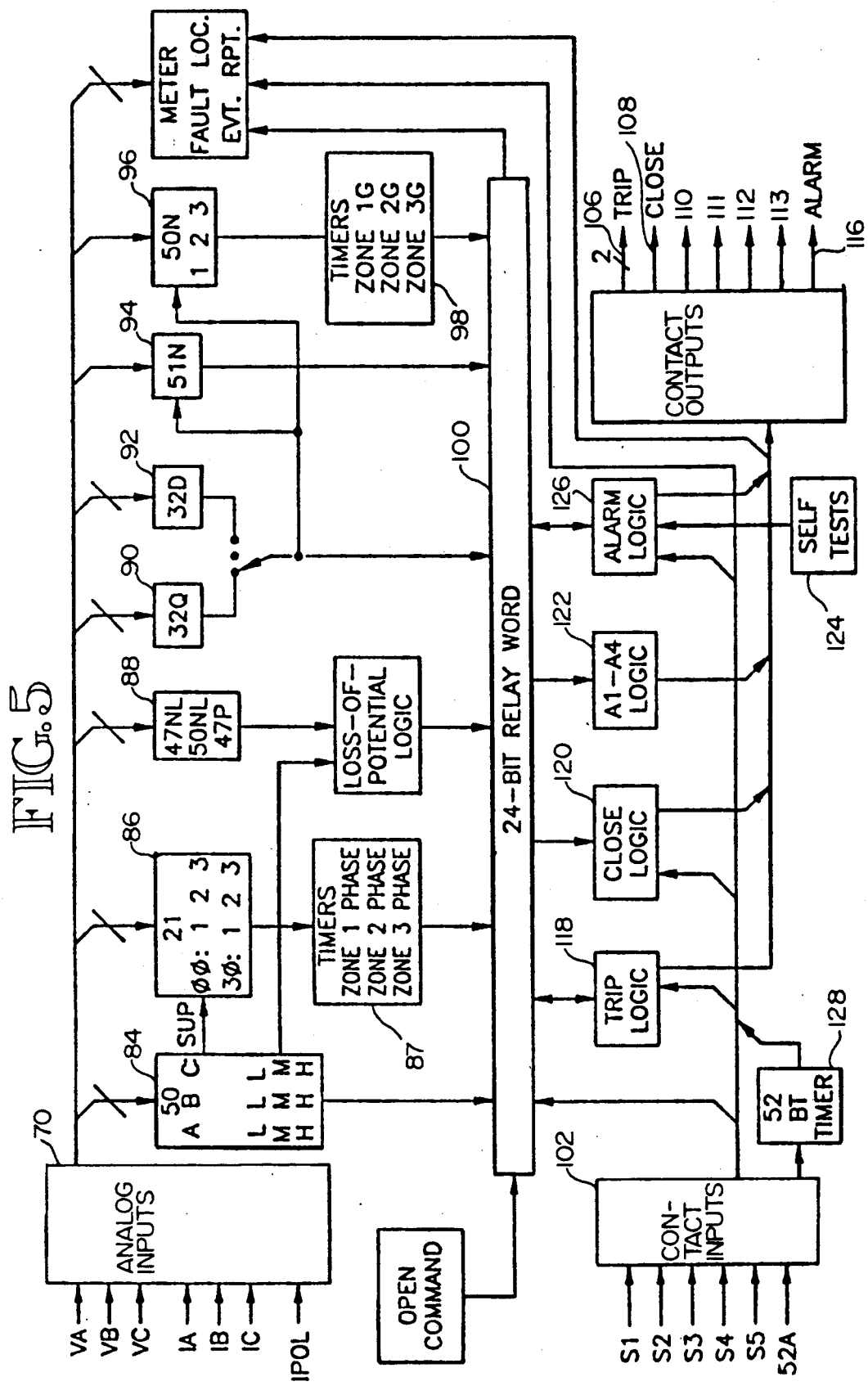

PROGRAMMABLE BUS-TIE RELAY HAVING A PLURALITY OF SELECTABLE SETTING GROUPS

TECHNICAL FIELD

This invention relates generally to programmable, microprocessor-based relays for use in power transmission systems and more specifically concerns such a relay which is used in conjunction with a bus-tie circuit breaker for temporary replacement of a selected one of a plurality of in-place relay/circuit breaker combinations during the performance of maintenance or other work thereon.

BACKGROUND ART

In the transmission of electrical power there will exist, at the substation level, one or more main power buses, to which are connected a plurality of individual transmission lines which extend outwardly from the substation, forming a portion of a power grid network. Interconnecting the power bus with each individual transmission line is a main circuit breaker and associated relays and switches. The relays may be of various configurations, including mechanical, electro-mechanical, and/or programmable microprocessor-based (computer) relays. These relays for each transmission line control the operation of the main circuit breaker associated therewith. When the relays recognize a fault condition of some kind on the transmission line, the circuit breaker is tripped to interrupt the power on the line, either on a temporary or more long-term basis, depending on the particular fault condition.

During normal operation of any power transmission system, the main circuit breakers and their associated relays and switches will require maintenance or replacement from time to time. In that event, a temporary replacement breaker and its associated relays are switched into the circuit via a power transfer bus. This combination of replacement breaker and associated relays and switches is generally referred to as a bus-tie breaker system. A number of disadvantages, however, are associated with existing bus-tie breaker systems. Typically, a single bus-tie breaker system must be able to replace temporarily any one of a plurality of in-place main breaker systems, each one having different relay settings. Existing bus-tie breaker systems use primarily electro-mechanical devices which in themselves include no operator capability for relay setting adjustment. Multiple relays which are connected to special switching circuits and ratio-changing transformers make it possible for an operator to provide a small range of relay settings so that the bus-tie breaker can temporarily replace any one of the plurality of main circuit breaker combinations.

However, the extra relays, complicated switching circuits and ratio-changing transformers make the existing bus-tie breaker relay systems complicated, expensive, and bulky. A traditional bus-tie breaker system could fill two or three control panels at the substation, each control panel being 90 inches high and 24 inches wide.

Further, such existing systems are clearly recognized in the industry as being a compromise relative to protection. Ideally, the relay settings of a bus-tie breaker system should be adjustable to match closely the relay settings of the particular breaker combination being temporarily replaced. However, this is not possible with existing bus-tie breaker relay systems and hence, there will, as indicated above, typically result severe compromises with respect to adequate matching.

Hence, in summary, due to poor matching capability, system complexity and otherwise limited functional capability of existing bus-tie relay systems, the power transmission system is at a potential operating disadvantage when an existing bus-tie breaker is connected in the system. In addition to operating disadvantages, the high cost and significant space requirements of existing systems are also important considerations.

It is thus highly desirable that a bus-tie breaker system have the capability of providing a good match with the breaker relay system it is intended to temporarily replace, as well as providing all the other typical functions thereof. While programmable, microprocessor-based relays are known which could in a broad sense provide adequate matching capability, the use of such an existing apparatus in a bus-tie breaker system would require an on-site, highly skilled technician capable of reprogramming the relay for each use. This would be a lengthy and expensive process, and would be particularly disadvantageous when the use of the bus-tie breaker was required at unexpected times.

DISCLOSURE OF THE INVENTION

Accordingly, the present invention is a bus-tie relay for use with a bus-tie circuit breaker, the bus-tie relay being selectively connectable between any one of an associated plurality of power transmission lines and a power bus line, wherein the bus-tie relay and the bus-tie circuit breaker are used to temporarily replace a selected in-place relay and circuit breaker associated with one of the plurality of power transmission lines. The relay comprises means for storing values for a plurality of relay element setting groups, each setting group comprising, respectively, operating conditions for one of the associated plurality of transmission lines corresponding substantially to the setting group values for the in-place relay associated therewith; means for selecting one of the stored setting groups; means for receiving voltage and current input values of the power signal present on the transmission lines which is associated with the one selected setting group; and means for processing the voltage and current input values relative to values of said one selected setting group and for providing output signals indicating an out-of-tolerance condition relative thereto.

BRIEF DESCRIPTION OF THE DRAWINGS

FIG. 1 is a simplified block diagram illustrating a power transmission system and the use of a bus-tie breaker.

FIG. 2 is a simplified block diagram showing the structure of the present invention.

FIG. 3 is a table illustrating a digital input signal feature of the present invention.

FIG. 5 is a block diagram showing the overall functional operation of the apparatus of the present invention.

BEST MODE FOR CARRYING OUT THE INVENTION

Figure 4:
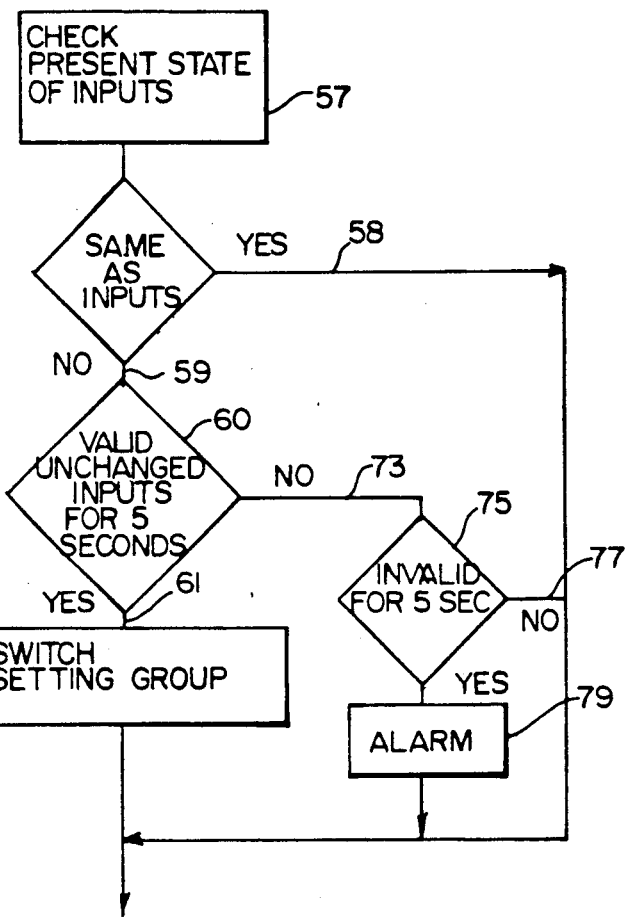
FIG. 4 is a simple flow chart illustrating a time delay feature of the present invention.

FIG. 1 shows generally a typical circuit arrangement in which a bus-tie breaker system is used in a conventional power-transmission system. For purposes of illustration, there is shown a single main power bus 10 and four transmission lines 12 through 15 which are connected to the power bus 10. The transmission lines 12 through 15 carry power to selected destinations in the power grid. Connected between each transmission line and the power bus 10 are a set of protective relays having selected settings and a main circuit breaker, shown combined at 18 through 21 for each line 12 through 15, referred to hereinafter as breaker combinations. Each breaker combination 18 though 21 is connected by disconnect switches 24 through 27 to the power bus 10. The above-described elements, i.e. the main power bus 10, the plurality of transmission lines 12 through 15, and the breaker combinations 18 through 21 and their associated disconnect switches 24 through 27 comprise a conventional part of a power transmission system. It should be understood that a fewer or greater number of transmission lines and associated breaker combinations and switches could be used in a particular power transmission system.

In order to repair and/or maintain the individual breaker combinations from time to time, a transfer bus 30 is required, as well as a bus-tie breaker combination 32 and its associated disconnect switch 34. Transfer switches 38 through 41 control the connection of the bus-tie structure into the system. Once the appropriate transfer switch and the disconnect switch 34 are closed, the operator can close the bus-tie breaker 32. Then the selected breaker combination to be repaired/replaced can be opened and isolated by its disconnect switches, thereby effectively removing that breaker combination from the circuit. This can typically be done quickly and efficiently.

While the above arrangement has proven to be effective to a limited extent, the overall system is at a potential disadvantage when the bus-tie breaker is actually operating in the system. The relay settings, i.e. operational characteristics of an existing bus-tie breaker combination, are typically a substantial compromise relative to the individual settings of the breaker combinations 18 through 21. Existing bus-tie breaker relay systems are capable of only a small range of adjustment in order to attempt to match relay settings of any one of several breaker combinations, which settings can vary significantly. It is accordingly typically quite desirable that existing bus-tie breakers be actually in a system for as short a time as possible, to avoid possible miscoordination of the overall power system protection in the event of a fault.

The present invention, as described below, is a new bus-tie breaker relay system which is structured and arranged so as to provide a good match with the relay settings of any one of the in-place breaker combinations in the system. Further, the relay has a functional capability very similar to the relays of the in-place breaker combinations. Still further, the relay is significantly less expensive and requires much less physical space than existing systems.

FIG. 2 shows a simplified diagram of the bus-tie breaker apparatus of the present invention. It includes two main elements, which in FIG. 2 are show as physically separate elements, but which could be combined into a single unit. These two elements are a switching member 44 and a programmable, microprocessor-based relay 46 (referred to as a "computer" relay). The switching member 44 in the embodiment shown includes an eight-position mechanical switch 54 and an associated logic circuit 56. The computer relay 46 includes the capability of receiving a plurality of conventional analog inputs, i.e. current and voltage values for the three phases of the power signal being transmitted, as well as the capability of receiving control commands and producing output signals which control the circuit breaker, produce an alarm and accomplish other specific functions, such as producing event reports, etc., very similar to that for other computer relays.

The mechanical switch 54 is conventional and in the embodiment shown has eight separate positions. This could of course be a different number. Also, different kinds of switches, mechanical electromechanical, and electronic, could be used. Logic circuit 56 senses the position of the switch 54 and produces a corresponding position-identifying digital output signal on output line 58, shown as a single line in FIG. 2. The actual signal output of logic circuit 56, however, is on five logic lines, which are applied as inputs to computer relay 46. The signals on the five logic lines are produced in accordance with the truth table of FIG. 3, and identified as "contact inputs" (referring to inputs to the computer relay 46) S1 through S5. With five logic lines, it is well known that a total of 32 different digital signal combinations could be produced. In this case however, only eight different signals for the mechanical switch and one additional signal for a remote setting capability are required. Of course, it should be understood that a different number of settings could be accommodated.

The logic circuit is arranged using conventional principles to provide the following particular output signal combinations. For example, when the switch 54 is in position 1, logic lines S1 and S2 are high, while logic lines S3-S5 are low. When switch 54 is in position 2, logic lines S2 and S3 are high, while logic lines S1, S4 and S5 are low. Similar specific signal combinations are provided for each switch position, as set out in the truth table of FIG. 3.

A feature of the present invention is the use of particular logic to provide a "high" condition for two, but only two, of the five logic lines for each switch position. As can be seen from the truth table in FIG. 3, each switch setting has two, but only two, high states, out of five possible. This arrangement permits a simple verification of a valid logic circuit output, i.e. a valid logic circuit output (contact input) will have two highs in five positions. As an example from FIG. 3, the logic signal for setting 1 is 11000, while setting 2 is 01100. If a particular signal on lines S1-S5 has fewer or greater than two highs out of five, that signal is invalid and is not recognized. Other combinations besides two out of five could be used. It should also be understood that this validation feature could be used in other circuit applications besides bus-tie breaker systems.

In FIG. 2, the five logic lines, referred to elsewhere as contact inputs S1 through S5, are shown as a single input line connection 58 between logic circuit 56 and relay 46. The signals on contact inputs S1 through S5 first encounter a short time delay circuit 60 in computer relay 46, in the form of a software routine, which is shown in flow chart form in FIG. 4. Referring to FIG. 4, there is a periodic check, i.e. interrogation or sensing (logic block 57) of the signal state of inputs S1 through S5. If the line conditions are unchanged, then an indication is provided on the "Yes" decision branch (line 58), while if there has been a change, indicating a change in position (a new setting) of selection switch 54, then there is provided an indication on the "No" branch (line 59), which initiates a five second timer included in decision circuit 60. If at the end of the five seconds the new setting remains the same, then an indication on "Yes" branch 61 occurs and the change in the setting group in the computer relay is made in accordance with the position of the switch. If, however, the new setting is changed again within the five seconds, then an indicator on the "No" branch 73 of decision circuit 60 occurs. A further five second timer is included in decision circuit 75. If the indication on the "No" branch 73 input continues for less than five seconds (meaning that there occurs an indication on "Yes" branch 61 within that five seconds), indicating a valid setting, then an indication on the "No" branch 77 from circuit 75 occurs and the operation of the relay continues with the valid setting. If the No indication on line 73 continues for more than five seconds, then an alarm 79 rings, which calls the attention of an operator to the input status of the relay.

Figure 7:
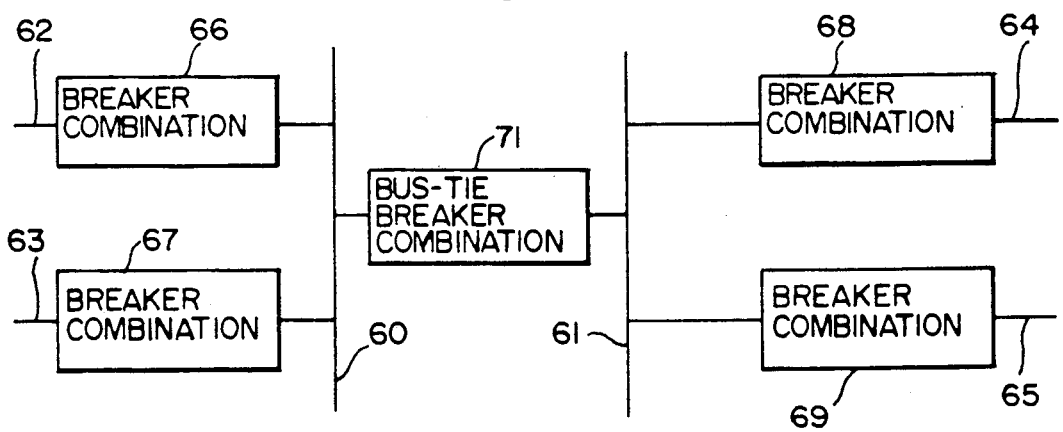
FIG. 7 is a simplified diagram showing a circuit for reversing the current direction through the apparatus of the present invention.

FIG. 7 shows another input feature of the present invention involving a power line arrangement referred to as a double bus, for example, buses 60 and 61 in FIG. 7, and, for purposes of illustration, transmission lines 62 through 65. Again, for simplicity of illustration, the in-place combination of circuit breakers, relays and switches are simply shown as blocks 66 through 69. A bus-tie breaker combination 71 of the present invention connects the two main buses 60 and 61. Such an arrangement is capable of handling current flow in two directions, by means of a relay setting command, instead of having to reverse the connections on the relay. For instance, if breaker combination 66 on transmission line 62 is to be switched out and temporarily replaced by the bus-tie breaker combination 71, then the current will be toward the left in FIG. 7. However, if breaker combination 68 on line 64 is to be switched out, then the current is to the right in FIG. 7. The arrangement shown permits a single bus-tie breaker relay to accommodate two main buses with their associated transmission lines and opposing current directions.

Referring now to FIG. 2, assuming that the logic signals at contact inputs S1-S5 are a valid input signal, then sensor 80 will proceed to recognize and decode the logic signals, which are in a digital format, and then by means of selection control software (in ROM), the correct one of a plurality of preprogrammed relay setting groups which are in EEPROM storage in the relay will be selected. As discussed above, computer relay 46 is a programmable computer relay, which features the capability of programmable relay settings. In the present invention, however, instead of computer relay 46 having only one programmed group of relay settings which matches the one particular transmission line configuration and provides the selected protective features therefor, a plurality of programmed relay settings are stored in memory in the relay, with one group of settings being selected at a time by the operator via the switching member 44 to provide the particular operating characteristics of the relay at a particular time. While a conventional computer relay could conceivably be reprogrammed in accordance with the values of each individual relay setting group, this would require the services of a highly skilled technician, and would be inconvenient, time-consuming and expensive. Also, in emergency situations, such an approach would simply not be workable, because a control operator and not a technician must perform the switching.

In relay 46, a plurality of complete relay setting groups are stored in memory, with each setting group being associated with a particular position of the selector switch 54. Each setting group in memory is programmed to match as closely as possible the relay settings of the relays of one of the in-place breaker combinations connectable to the bus-tie breaker relay 46. Hence, when switch 54 is on a particular setting and the bus-tie relay is switched into operation in the power transmission system, the relay 46 essentially operates as a duplicate of the relays in the in-place breaker combination being temporarily replaced.

After the computer relay 46 is initially programmed so that all of the values of the relay setting groups for all of the in-place relays in the transmission system to be potentially serviced by relay 14 are in memory in relay 46, then the relay 46 and its associated circuit breaker are capable of functioning as a bus-tie breaker combination which provides substantial operating matches with each in-place breaker combination, resulting in significant advantages in performance, cost and size over prior art systems.

As indicated above, each relay setting group includes values for a plurality of particular relay functions, referred to individually as relay elements. These relay functions are all well-known in the art. In the bus-tie breaker relay of the present invention, the values of these functions for each relay setting group are programmed into memory in the relay apparatus, as mentioned above. These relay functions include the positive sequence of primary impedance of the transmission line as well as the zero sequence of primary impedance of the line. This function provides the values of symmetrical components which together can be used to describe a resulting unbalanced polyphase transmission system. Line length is another relay function, as are CT ratio and PT ratio. Further, there is a value for maximum torque angle, as well as a yes/no indication for fault location. Also included will be distance reach settings for protective zones 1, 2, and 3 of the system, as well as timers for delaying an indication of, and circuit breaker tripping for, phase and three phase faults in each zone. Further, there is a phase overcurrent function, including low pick-up, medium pick-up, and high pick-up values therefor as well as a phase overcurrent delay capability. Also, there will be values of residual time overcurrent pick-up, residual time overcurrent time dial, and a residual time overcurrent curve index relative to a particular set of time-overcurrent characteristics. There will also be values for residual instantaneous overcurrent for zones 1, 2, and 3, as well as possible time delays therefor. Still further, there will be a indication for zone 3 direction (forward or reverse) and yes/no indications for negative sequence directional supervision of the ground overcurrent elements and for voltage polarization for the zero sequence directional element. Other possible relay functions include blocking the tripping of the circuit breaker when loss of potential is detected, as well as delay time-outs for inputs on serial data communication ports 1 or 2 (typically from zero to 30 minutes). The above individual relay functions are only summarized, as they are well-known in the art. One exception is the relay function in a setting group for determining the direction of the relay, relative to the bus line and the transmission lines, which is important for applications such as the double power bus arrangement of FIG. 7.

Each relay setting group programmed into EEPROM memory in relay 46 will include values/indications of many if not all of the above; the actual values will match the relay function values of one relay combination in the transmission line system in which relay 46 is connected as part of a bus-tie breaker combination.

FIG. 5 shows a functional block diagram for the computer relay 46 of the present invention. Although the present invention is not directed specifically toward the basic relay structure itself, the basic relay structure and operation makes possible the present invention. Voltage and current analog input signals are applied to the relay at 70 for each of the three phases (A, B, and C) of a three-phase power signal on a given transmission line. One or more of these signals are applied to the various relay elements comprising relay 46. Each of these elements are individually well-known in the art and therefore are not explained in detail. Element 84 is a phase overcurrent element, with low, medium, and high settings for each phase. Element 86 is a distance current element for both phase-phase and 3 phase for the three relay protective zones relative to the transmission line. Element 87 includes time delays for the distance current elements. Element 88 contains a zero sequence overvoltage element, a zero sequence overcurrent element, and a positive sequence over voltage element. Element 90 is a negative sequence direction element (forward or reverse) while element 92 is a zero sequence direction element (forward or reverse). Element 94 is a residual time overcurrent element, while element 96 is the residual instantaneous overcurrent elements for each of the three zones. Element 98 includes values of time delay for the element 96. The values for the above relay elements in relay 46 are partially combined through intermediate logic to form a 24-bit relay word 100.

As discussed above, the particular values of the relay elements discussed above are selected through logic lines S1 through S5 at the contact input block 102. The outputs of the relay include a circuit-breaker trip line 106, a circuit-breaker close line 108, selectable outputs 110 through 113, and a system alarm output 116. Software control is provided for producing the various outputs. Logic function 118 controls the trip output 106; logic function 120 controls the relay reclosing output line 108; logic function 122 controls the specialized output lines 110 through 113, which provide signals at selected events to accomplished selected results which will vary from relay to relay; and self test circuit 124 and alarm logic 126 control the output on alarm line 116. All of the above logic functions are implemented in firmware and stored in ROM. Timer 128 controls the delay, if any, of the trip output on line 106 for a selected number of cycles.

Figure 6:
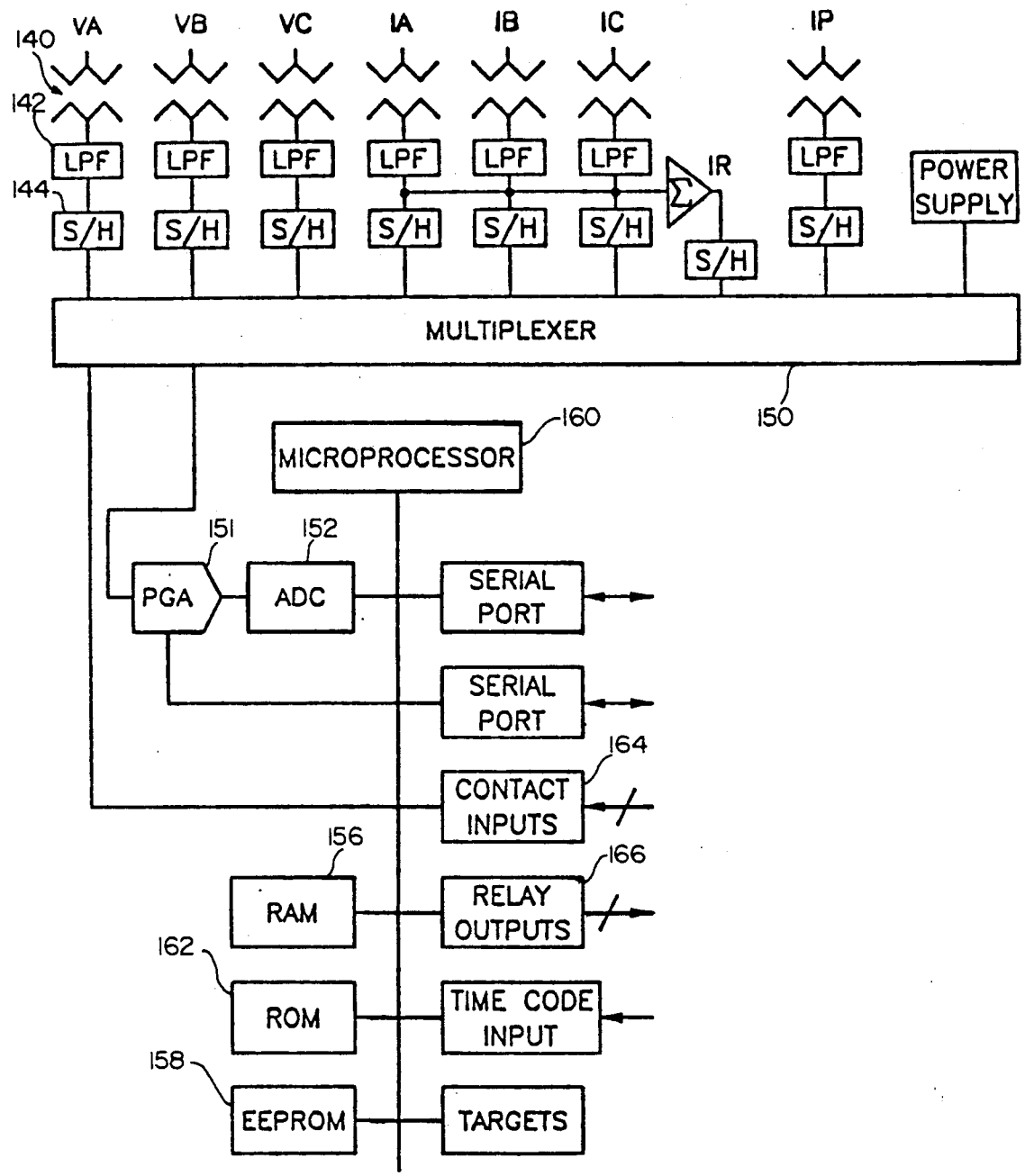
FIG. 6 is a block diagram showing the basic hardware elements of the present invention.

The firmware logic interacts with the relay elements in response to the analog input values to produce the specified outputs in a manner clarified by the diagram of FIG. 6. Each of the voltage and current inputs (VA, VB, VC and IA, IB, IC) for the three phases of the power signal on the transmission line are applied first through a transformer 140 to reduce the voltage and current levels to appropriate levels for the relay and then through a low-pass filter 142 and a sample-and-hold circuit 144. The current values, after low pass filtering, are also summed and applied to a sample-and-hold circuit. The signals from the sample-and-hold circuits are then applied to a multiplexer 150 and from there to a programmable gain amplifier 151 and then an A-D converter 152. The overall result is that measured voltage and current values of the power signal are supplied to the relay as inputs approximately four times per cycle.

These values are stored in RAM (random access memory) storage 156 in the relay. RAM storage 156 also contains the relay word described above, comprised of the values of the selected relay elements of the relay. EEPROM (electronically erasable programmable read only memory) 158 contains the plurality of relay setting group values, from which one is selected by the operator via selection switch 54 for emulation of an in-place relay which is to be temporarily replaced. In addition to the relay setting group information, EEPROM 158 contains the relay logic information, i.e. the logic masks. The microprocessor CPU 160 performs the computations and comparisons, under the control of the relay software which is stored in ROM (read only memory) 162. The selection of a particular setting group is accomplished through the contact inputs connection 164 while the output signals from the relay are provided through relay output connection 166. The relay contact outputs (trip, close, alarm, etc.) are the result of the processing of the current and voltage measured values relative to the values comprising the relay word and the logic mask values or the processing of commands received through the serial communication ports 170,172.

Although a preferred embodiment of the invention has been disclosed herein for illustration, it should be understood that various modifications and substitutions may be incorporated in such embodiment without departing from the spirit of the invention as defined by the claims which follow.

What is claimed is:

1. A bus-tie relay for use with a bus-tie circuit breaker, selectively connectable between any one of an associated plurality of power transmission lines and a power bus line, wherein the bus-tie relay and the bus-tie circuit breaker are used to temporarily replace a selected in-place relay and circuit breaker associated with one of the plurality of power transmission lines, the relay comprising:
   means for storing values for a plurality of relay element setting groups, each setting group comprising, respectively, a plurality of preselected operating conditions for one of the associated plurality of transmission lines, corresponding substantially to the setting group values for the in-place relay associated therewith;
   means for selecting one of said plurality of said stored setting group values;
   means for receiving voltage and current input values of the power signal present on the power transmission line associated with said one selected setting group; and
   means for processing said input values relative to values of said one selected setting group and for providing output signals indicating an out-of-tolerance condition relative thereto.

2. An apparatus of claim 1, including means for changing the values of any one of said stored setting groups.

3. An apparatus of claim 1, wherein said selecting means is a switch having a plurality of positions.

4. An apparatus of claim 3, including means for producing a digital signal corresponding to the position of the switch, the digital signal means including a plurality of digital signal lines and means establishing signal conditions on said signal lines identifying the position of the switch.

5. An apparatus of claim 4, wherein the digital signal means includes means establishing the validity of the digital signal, a valid digital signal always comprising a selected signal condition on a selected number only of said digital signal lines.

6. An apparatus of claim 5, wherein the digital signal means includes five digital signal lines, the selected number is two and the selected signal condition is a signal "high."

7. An apparatus of claim 4, including means responsive to said digital signal on the digital signal lines for obtaining the values of said selected one stored setting group from memory, such that they become an operative setting group within the relay.

8. An apparatus of claim 7, including means for time-delaying the changing of the operative setting group following a change in the position of the switch.

9. An apparatus of claim 1, including means for selecting a relay element setting group from a remote source.

10. An apparatus of claim 1, including circuit means for accommodating current flow in opposing directions in said plurality of transmission lines.

11. An apparatus of claim 1, wherein the stored values of each said plurality of relay element setting groups corresponds substantially to the operating characteristics of one of the in-place relays associated, respectively, with the plurality of power transmission lines.

12. A system for validating the accuracy of a digital signal on a plurality of digital lines, the digital signal being derived from a source of information comprising:
a circuit responsive to said source of information for producing digital signals having a validity characteristic, wherein each discrete item of information from said source of information is represented by a digital signal, and wherein the validity characteristic comprises the presence of a selected digital signal condition on a selected number only of said digital signal lines.

13. An apparatus of claim 12, wherein the source of information is a switch and each discrete item of information is a particular position of said switch.

14. An apparatus of claim 13, wherein the selected digital signal condition is a digital "high" and wherein said selected number is at least two.

* * * * *